United States Patent
Fowler et al.

(10) Patent No.: US 11,570,485 B2
(45) Date of Patent: Jan. 31, 2023

(54) SYSTEM AND METHOD FOR PROVIDING SYNCHRONIZED INTERACTIVE MULTIMEDIA CONTENT TO MOBILE DEVICES BASED ON GEOLOCATION OF A VEHICLE

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 17/453,907

(22) Filed: Nov. 8, 2021

(65) Prior Publication Data
US 2022/0060759 A1    Feb. 24, 2022

Related U.S. Application Data

(63) Continuation of application No. 17/022,808, filed on Sep. 16, 2020, now Pat. No. 11,206,432, which is a
(Continued)

(51) Int. Cl.
*H04N 21/214* (2011.01)
*G06Q 30/02* (2012.01)
*G06K 7/14* (2006.01)

(52) U.S. Cl.
CPC ....... *H04N 21/2146* (2013.01); *G06K 7/1417* (2013.01); *G06Q 30/0237* (2013.01)

(58) Field of Classification Search
None
See application file for complete search history.

(56) References Cited

U.S. PATENT DOCUMENTS 6,144,304 A   11/2000   Webb
6,658,348 B2  12/2003   Rudd et al.
(Continued)

FOREIGN PATENT DOCUMENTS

EP   2254083 A1   11/2010
EP   2988260 A1    2/2016
(Continued)

OTHER PUBLICATIONS

International Search Report issued in International Application No. PCT/US2021/071461 dated Feb. 10, 2022.
(Continued)

*Primary Examiner* — Carl Adams
(74) *Attorney, Agent, or Firm* — Vos-IP, LLC

(57) ABSTRACT

A system has a plurality of machine-readable tags and includes a server system for synchronizing the display of interactive mobile content on a user device with a destination of a vehicle. Each machine-readable tag encodes an address and is mounted within the vehicle for access by users in the vehicle. The system receives a request from the user device, generated by scanning one of the machine-readable tags, and determines the destination of the vehicle. A coupon corresponding with the destination of the vehicle is selected and provided. The users that have selected the coupon for download are determined, each of the users who have downloaded the coupon are notified of the identities of the other users who downloaded the coupon, and transportation of all of the users is facilitated to the location of the restaurant so they may utilize the coupon which each of them downloaded.

10 Claims, 5 Drawing Sheets

Related U.S. Application Data continuation-in-part of application No. 16/155,605, filed on Oct. 9, 2018, now abandoned, which is a continuation-in-part of application No. 16/003,092, filed on Jun. 7, 2018, now abandoned.

(60) Provisional application No. 62/516,644, filed on Jun. 7, 2017.

(56) References Cited

U.S. PATENT DOCUMENTS

| | | | |
|---|---|---|---|
| 7,379,886 | B1 | 5/2008 | Zaring et al. |
| 7,587,214 | B2 | 9/2009 | Inselberg |
| 7,817,990 | B2 | 10/2010 | Pamminger et al. |
| 3,056,802 | A1 | 11/2011 | Gressel et al. |
| 8,494,838 | B2 | 7/2013 | Donabedian et al. |
| 8,731,583 | B2 | 5/2014 | Wengrovitz |
| 8,971,861 | B2 | 3/2015 | Gupta et al. |
| 9,002,727 | B2 | 4/2015 | Horowitz et al. |
| 9,117,231 | B2 | 8/2015 | Rodgers et al. |
| 9,201,470 | B2 | 12/2015 | Kim et al. |
| 9,223,750 | B2 | 12/2015 | Liu et al. |
| 9,223,885 | B2 | 12/2015 | Marsico |
| 9,324,079 | B2 | 4/2016 | Moulin et al. |
| 9,405,844 | B2 | 8/2016 | Lim et al. |
| 9,451,389 | B2 | 9/2016 | Beg et al. |
| 9,681,302 | B2 | 6/2017 | Robinton et al. |
| 9,767,645 | B1 | 9/2017 | Cronin et al. |
| 9,826,049 | B2 | 11/2017 | Lim et al. |
| 9,870,585 | B2 | 1/2018 | Cronin et al. |
| 9,883,344 | B2 | 1/2018 | Bolton et al. |
| 9,965,819 | B1 | 5/2018 | Devries |
| 10,009,429 | B2 | 6/2018 | Garcia Manchado |
| 10,127,746 | B2 | 11/2018 | Bergdale et al. |
| 10,163,124 | B2 | 12/2018 | Horowitz et al. |
| 10,178,166 | B2 | 1/2019 | Sharan |
| 10,248,905 | B1 | 4/2019 | Beatty |
| 10,942,913 | B1 | 3/2021 | Khoyilar et al. |
| 2001/0050310 | A1 | 12/2001 | Rathus et al. |
| 2002/0016816 | A1 | 2/2002 | Rhoads |
| 2003/0008661 | A1 | 1/2003 | Joyce et al. |
| 2003/0041155 | A1 | 2/2003 | Nelson et al. |
| 2006/0094409 | A1 | 5/2006 | Inselberg |
| 2007/0229217 | A1 | 10/2007 | Chen et al. |
| 2009/0085724 | A1 | 4/2009 | Naressi et al. |
| 2009/0138920 | A1 | 5/2009 | Anandpura et al. |
| 2009/0189982 | A1 | 7/2009 | Tawiah |
| 2010/0184462 | A1 | 7/2010 | Lapstun et al. |
| 2010/0228577 | A1 | 9/2010 | Cunningham et al. |
| 2010/0279710 | A1 | 11/2010 | Dicke et al. |
| 2011/0034252 | A1 | 2/2011 | Morrison et al. |
| 2012/0011015 | A1 | 1/2012 | Singh et al. |
| 2012/0130770 | A1 | 5/2012 | Heffernan |
| 2012/0233237 | A1 | 9/2012 | Roa et al. |
| 2012/0280784 | A1 | 11/2012 | Gaviria Velez et al. |
| 2013/0073366 | A1 | 3/2013 | Heath |
| 2013/0080218 | A1* | 3/2013 | Wildern, IV ........ G06F 16/9554 705/14.1 |
| 2013/0085834 | A1 | 4/2013 | Witherspoon, Jr. et al. |
| 2013/0166384 | A1 | 6/2013 | Das |
| 2013/0218721 | A1 | 8/2013 | Borhan et al. |
| 2013/0275221 | A1 | 10/2013 | Zeto, III et al. |
| 2013/0297430 | A1 | 11/2013 | Soergel |
| 2013/0311214 | A1 | 11/2013 | Marti et al. |
| 2014/0039945 | A1 | 2/2014 | Coady et al. |
| 2014/0046802 | A1 | 2/2014 | Hosein et al. |
| 2014/0058886 | A1 | 2/2014 | Gopalakrishnan et al. |
| 2014/0156752 | A1 | 6/2014 | Fetyko |
| 2014/0278592 | A1 | 9/2014 | Giampapa |
| 2014/0279072 | A1 | 9/2014 | Serino |
| 2014/0282684 | A1* | 9/2014 | Keen ........................ H04N 7/18 725/30 |
| 2014/0365574 | A1 | 12/2014 | Franks et al. |
| 2015/0012307 | A1 | 1/2015 | Moss |
| 2015/0067811 | A1 | 3/2015 | Agnew et al. |
| 2015/0073879 | A1 | 3/2015 | Acosta-Cazaubon |
| 2015/0081532 | A1 | 3/2015 | Lewis et al. |
| 2015/0088658 | A1 | 3/2015 | Iiduka et al. |
| 2015/0112704 | A1 | 4/2015 | Braun |
| 2015/0120388 | A1 | 4/2015 | Tan et al. |
| 2015/0161684 | A1 | 6/2015 | Raikula |
| 2015/0279164 | A1 | 10/2015 | Miller et al. |
| 2015/0294392 | A1 | 10/2015 | Sharon et al. |
| 2015/0296347 | A1 | 10/2015 | Roth et al. |
| 2015/0304601 | A1 | 10/2015 | Hicks et al. |
| 2015/0348329 | A1 | 12/2015 | Carre et al. |
| 2016/0086228 | A1 | 3/2016 | Babb et al. |
| 2016/0104041 | A1 | 4/2016 | Bowers et al. |
| 2016/0104347 | A1 | 4/2016 | Yang |
| 2016/0189287 | A1 | 6/2016 | Van Meter |
| 2016/0191821 | A1 | 6/2016 | Dwarakanath et al. |
| 2016/0217258 | A1 | 7/2016 | Pitroda et al. |
| 2016/0282619 | A1 | 9/2016 | Oto et al. |
| 2016/0307379 | A1 | 10/2016 | Moore, Jr. et al. |
| 2016/0335565 | A1 | 11/2016 | Charriere et al. |
| 2016/0381023 | A1 | 12/2016 | Dulce et al. |
| 2017/0039599 | A1 | 2/2017 | Tunnell et al. |
| 2017/0142460 | A1 | 5/2017 | Yang et al. |
| 2017/0250006 | A1 | 8/2017 | Ovalle |
| 2017/0330263 | A1 | 11/2017 | Shaffer |
| 2017/0337531 | A1 | 11/2017 | Kohli |
| 2018/0089775 | A1 | 3/2018 | Frey et al. |
| 2018/0276705 | A1 | 9/2018 | Jay et al. |
| 2018/0288394 | A1 | 10/2018 | Aizawa |
| 2018/0330327 | A1 | 11/2018 | Hertenstein et al. |
| 2018/0336286 | A1 | 11/2018 | Shah |
| 2018/0353999 | A1 | 12/2018 | McGillicuddy et al. |
| 2018/0376217 | A1 | 12/2018 | Kahng et al. |
| 2019/0098504 | A1 | 3/2019 | Van Betsbrugge et al. |
| 2019/0130450 | A1 | 5/2019 | Lamont |
| 2019/0220715 | A1 | 7/2019 | Park et al. |
| 2019/0385128 | A1 | 12/2019 | Cummings |
| 2020/0035019 | A1 | 1/2020 | Cappello et al. |
| 2020/0104601 | A1 | 4/2020 | Karoui et al. |
| 2020/0184547 | A1 | 6/2020 | Andon et al. |
| 2020/0213006 | A1 | 7/2020 | Graham et al. |
| 2020/0236278 | A1 | 7/2020 | Yeung et al. |
| 2020/0320911 | A1 | 10/2020 | Bruce |
| 2020/0327997 | A1 | 10/2020 | Behrens et al. |
| 2020/0413152 | A1 | 12/2020 | Todorovic et al. |
| 2021/0019564 | A1 | 1/2021 | Zhou et al. |
| 2021/0027402 | A1 | 1/2021 | Davis et al. |
| 2021/0065256 | A1 | 3/2021 | Shontz |
| 2021/0118085 | A1 | 4/2021 | Bushnell et al. |
| 2021/0247947 | A1 | 8/2021 | Jaynes et al. |
| 2021/0248338 | A1 | 8/2021 | Spivack et al. |
| 2022/0114228 | A1 | 4/2022 | Fowler et al. |
| 2022/0167021 | A1 | 5/2022 | French et al. |
| 2022/0172128 | A1 | 6/2022 | Lore |
| 2022/0188839 | A1 | 6/2022 | Andon et al. |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

International Search Report issued in International Application No. PCT/US2021/070471 dated Jun. 28, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.
"Blockchain", Wikipedia, Sep. 27, 2019.

(56) References Cited

OTHER PUBLICATIONS

"URL Redirection", Wikipedia, Mar. 21, 2021.
"Web Template System", Wikipedia, Mar. 2, 2021.
"QR Codes: Here They Come, Ready or Not", Printing Tips: Precision Printing Newsletter, vol. 1, No. 1, May 2011.
McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.
Unruh, "OU's Sooner Schooner Will Run on Field as Football Gameday Traditions Remain in New Ways: 'We Feel Like We Can Safely Do That'", The Oklahoman, Sep. 10, 2020, https://www.oklahoman.com/story/sports/columns/2020/09/10/sooner-schooner-will-run-field-football-gameday-traditions-remain-new-ways-feel-like-can-safely-that/60383091007/.

\* cited by examiner

SYSTEM AND METHOD FOR PROVIDING SYNCHRONIZED INTERACTIVE MULTIMEDIA CONTENT TO MOBILE DEVICES BASED ON GEOLOCATION OF A VEHICLE

CROSS-REFERENCE TO RELATED APPLICATIONS

This application is a continuation of U.S. patent application Ser. No. 17/022,808 filed on Sep. 16, 2020, which is a continuation-in-part of U.S. patent application Ser. No. 16/155,605 filed on Oct. 9, 2018, which is a continuation-in-part of U.S. patent application Ser. No. 16/003,092 filed on Jun. 7, 2018, which claims the benefit of U.S. Provisional Patent Application No. 62/516,644 filed on Jun. 7, 2017, with the United States Patent and Trademark Office, the contents of which are incorporated herein by reference in their entirety.

FIELD OF THE INVENTION

This invention relates generally to systems and methods for providing multimedia content to passengers onboard a vehicle, and more particularly to such a system that disseminates content that is synchronized in real time based on the geolocation of the vehicle.

BACKGROUND OF THE INVENTION

It is estimated that approximately 1.9 billion communication devices will include close range communication functionality for communication with other devices. Close range communication functionality may be, for example, near-field communication (NFC) functionality, Bluetooth functionality, and the like. NFC is a set of standards for communication device vs to establish radio communication with each other by touching them together or bringing them into close proximity, usually no more than a few centimeters. NFC applications include, for example, contactless transactions, data exchange, and the like. Communications devices may also receive information via machine-readable code (QR, Snapcode, etc.), and other technologies known in the art, or technologies later developed or adopted.

The prior art teaches various systems and methods for providing content to persons attending an event at a venue, such as a sports event, concert, and other similar location-based events. Examples of these teachings include the following:

Marsico, WO/2015/035055, teaches a system for performing multiple marketing operations at a sports venue, arena, etc. The system discusses a list of options, such as surveying a user, providing coupons (13), and other related provision of marketing materials. It also teaches enabling a user to order products (e.g., food) at the venue, for delivery to the scanned seat. The system uses a scannable information encoded graphic image, such as a bar code or a quick response (QR) code, near-field communication (NFC) code tag, radio-frequency identification (RFID) code tag. A mobile communication device such as a smartphone, tablet computer or other mobile computer may include a scan client module for scanning and communicating QR code information (either an app or without). QR code scanning is accomplished by a camera module that is associated with the smartphone or other mobile computing device. The scan-enabled client module communicates the scanned QR code information to an associated server application for collecting, processing, and reporting scan data. Marisco, U.S. Pat. No. 9,223,885, teaches a similar system for gathering survey information via a QR code system.

Lim, U.S. Pat. No. 9,826,049, teaches the basic system wherein QR codes or the like are used in hardlink applications (linking a physical object or location with a Web link), by which different users may receive different information in response to a user's interaction with a touchpoint. The content delivered to a particular user in response to a hardlink code or a presented hyperlink may be dependent on the time of the scan, the geographic location of the user, a weather condition at the geographical location, personal information associated with the user, a number of previous scans of the code by prior individuals, and any combination of the these or other variables, which may be determined by an originator of the QR code or other party. User devices may be redirected to alternate content or network addresses based on one or more programmed conditions.

Beg, U.S. Pat. No. 9,451,389, teaches a system for communicating informational content using a near-field communication (NFC). Uniquely programmed NFC stickers can be used conjunction with NFC-enabled devices, such as a smartphone, to upload a personalized multimedia greeting on a central server. Once the stickers have been distributed, a recipient can tap on the same sticker and play the greeting message using the smartphone. Retail consumers can tap on NFC tags with a smartphone to view product informational content that has been hosted on the central server by retailers and manufactures.

Rodgers, U.S. Pat. No. 9,117,231, teaches an order taking system for ordering menu items for delivery to a station at a premises, such as a table at a restaurant. The system uses a downloaded application, which is used to scan a QR code or NFC tag on a table. The location is identified using the restaurant and table identifier(s) extracted from the QR code. This location is used to identify the correct restaurant menu from the central platform database. The order may be placed, payment made, and delivery is made to the location corresponding to the QR code. Meter, U.S. 2016-0189287 A1 teaches a similar food ordering system.

Horowitz, U.S. Pat. No. 9,002,727, teaches a system which uses a QR code (or NFC tag) to direct a client device to send a first request to a first server identified by the URL. In response to the first request, the client device receives from the first server data configured to cause the client device to display, to a user of the client device, at least one of: a video or an interactive Web page. Responsive to the data encoded in the QR code, the client device sends to a coupon server identification data associated with a user of the client device, and a request for the coupon server to distribute a digital coupon (13) for an offer associated with an identifier encoded within the QR code to an account associated with the user. The distribution of the coupon (13) may be predicated upon the user of the client device to perform a "predetermined activity" (e.g., watching an advertisement video, etc.) to qualify for the coupon (13).

Lewis, U.S. 2015-0081532 A1, teaches a system that uses a combination of QR codes and venue specific localized WiFi to provide mobile venue related services in a covered venue area. The system includes food ordering and similar services, as well as a variety of other services.

The prior art teaches various forms of systems that use QR codes and the like to disseminate multimedia content and to enable activities such as ordering food, etc. However, the prior art teaches only static systems. The prior art does not teach a system that disseminates interactive media content that is synchronized in real time based on the geolocation and/or destination of a vehicle. The present invention fulfills these needs and provides further advantages as described in the following summary.

SUMMARY OF THE INVENTION

The present invention teaches certain benefits in construction and use which give rise to the objectives described below.

The present invention provides a system for synchronizing the display of interactive mobile content on a user device with a destination of a vehicle. The system includes a plurality of machine-readable tags, and a server system having a computer processor and a computer memory. Each of the machine-readable tags encodes an address identifiable by the server system and is operatively mounted within the vehicle for access by persons in the vehicle. The system performs the following steps: receiving a request from one of the user devices, the request being generated by scanning one of the machine-readable tags with the user device; determining the destination of the vehicle; and providing the interactive mobile content that corresponds with the destination of the vehicle. The users on the vehicle have selected the coupon for download are determined, each of the users who have downloaded the coupon are notified of the identities of the other users who downloaded the coupon and are all present in the same vehicle; and transportation of all of the users who have downloaded the coupon is facilitated, to the location of the restaurant so they may utilize the coupon which each of them downloaded.

A primary objective of the present invention is to provide a system having advantages not taught by the prior art.

Another objective is to provide a system for interacting with a user device via a plurality of machine-readable tags that enable the system to provide coupons to the user device based on the geolocation and/or destination of an aircraft.

A further objective is to provide a system that notifies the users, while they are on the aircraft, of an opportunity to travel to a restaurant proximate the airport, as a group with other user passengers.

A further objective is to provide a system that facilitates the transportation of the users to a restaurant in groups via a ride sharing application.

Other features and advantages of the present invention will become apparent from the following more detailed description, taken in conjunction with the accompanying drawings, which illustrate, by way of example, the principles of the invention.

BRIEF DESCRIPTION OF THE FIGURES

The accompanying drawings illustrate the present invention. In such drawings.

DETAILED DESCRIPTION OF THE INVENTION

Figure 1:
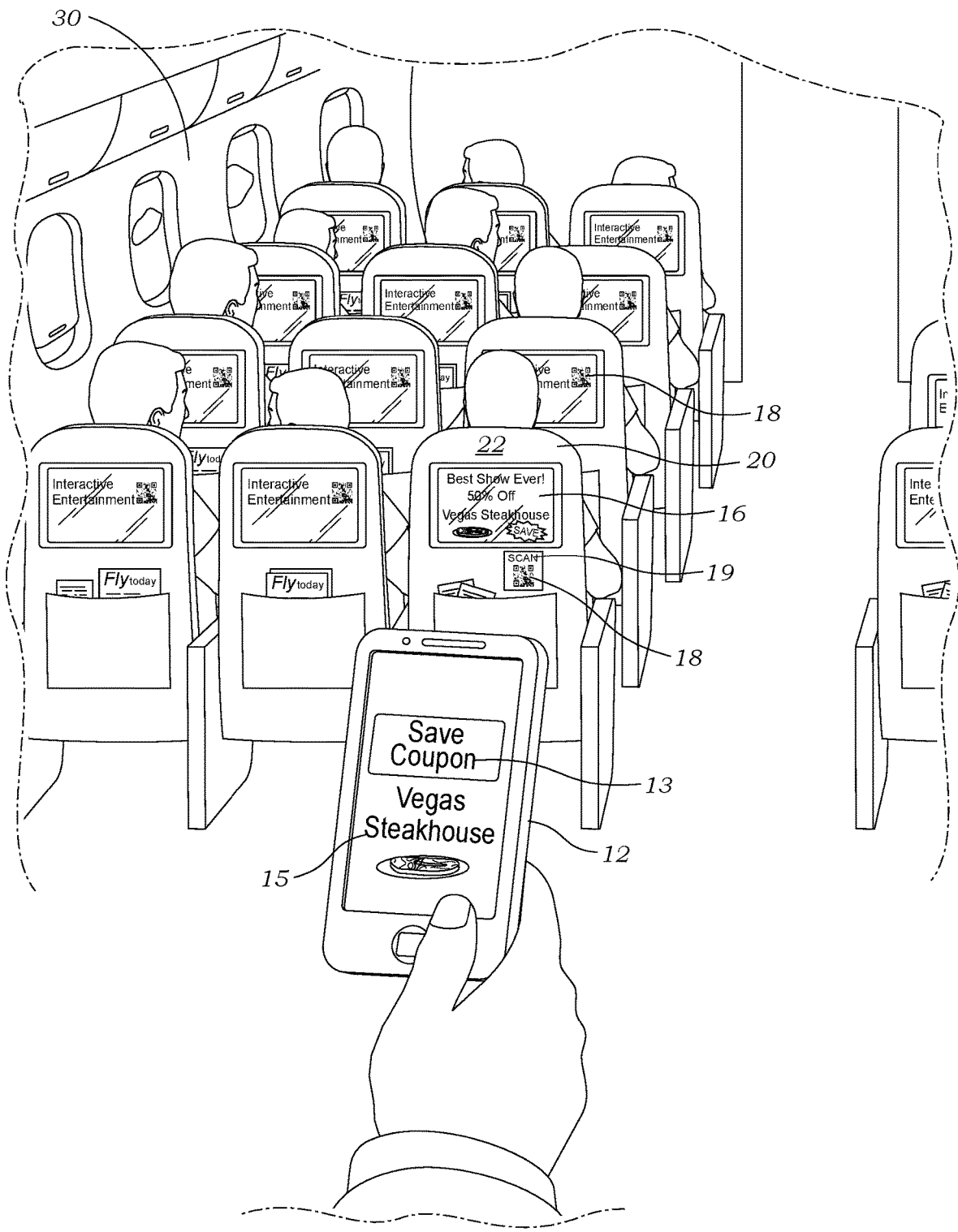
FIG. 1 is a perspective view of a cabin of an aircraft that includes one embodiment of the system interacting with a user device via a plurality of machine-readable tags that enable the system to provide interactive mobile content to the user device.

The above described drawing figures illustrate the invention, a system (10) for interacting with a user device (12) via a plurality of machine-readable tags (18) that enable the system (10) to provide interactive mobile content (15) to the user device (12) based on a geolocation and/or destination of a vehicle (30).

For purposes of this application, the term "vehicle" is defined to include any form of mobile vehicle, such as an aircraft, boat, ship, train, automobile, truck, motorhome, bus, and any other forms of vehicle known in the art.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects.

The following detailed description is, therefore, not to be taken in a limiting sense.

FIG. 1 is a perspective view of one embodiment of the system 10 installed in an aircraft (30). As discussed above, while an aircraft (30) is illustrated, any other form of vehicle may be similarly adapted for use with this invention. In this embodiment, the system (10) interacts with a user device (12) via a method that utilizes one of a plurality of machine-readable tags (18) to enable the system (10) to provide interactive mobile content (15) to the user device (12). The mobile content (15) may be synchronized with the geolocation and/or destination of the aircraft (30) via real-time flight tracking software, as discussed in greater detail below.

In one embodiment, the content (15), such as coupons, is selected as being proximate (e.g., within 30 miles) the destination of the aircraft. Coupons for restaurants that are located proximate the destination airport may be selected for options to each of the users. As discussed below, transportation to the restaurant may also be provided for one or more of the user/passengers.

As shown in FIG. 1, in this embodiment, the plurality of machine-readable tags (18) are each positioned in a suitable location within the vehicle (30), in this embodiment adjacent one of a plurality of seats (20) onboard a vehicle (30). In this embodiment, the tags (18) are each generated and displayed on a display screen (16) on a back surface (22) of the seat. The machine-readable tag (18) could alternatively be printed on a plate (19) or similar surface mounted on the back surface (22) of at least some of the plurality of seats (20). The tags (18) may be printed or otherwise mounted on or adjacent the seats (20) or placed in other locations adjacent the seats (20) or in other locations of the vehicle (30) (e.g., the floor, ceiling, walls, or other surrounding structures). While one example of this placement is illustrated, this should be broadly construed to include any placement inside of the vehicle (30) that is suitable for use as described herein.

For example, on a cruise ship, the tags (18) may be located in each passenger cabin, at points of departure, lounge areas, etc. Alternative placement schemes that may be devised by one skilled in the art, consistent with the teachings of the present invention, should be considered within the scope of the present invention.

Figure 2:
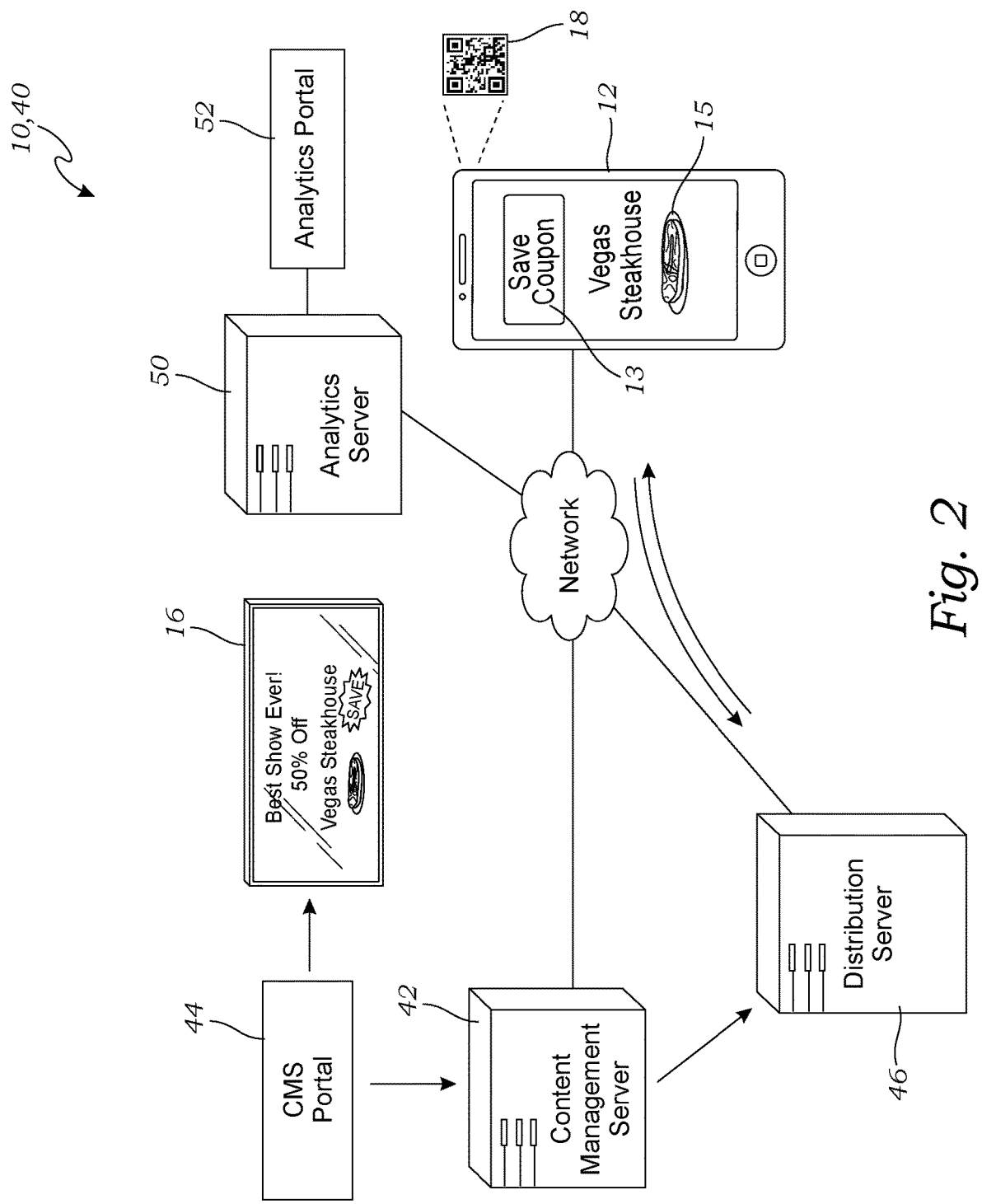
FIG. 2 is a block diagram of one embodiment of the system of FIG. 1.

Each of the machine-readable tags (18) encodes an address that will direct the user device (12) to a server system, as shown in FIG. 2 and discussed in greater detail below. For purposes of this application, the term "machine-readable tags" should be broadly construed to include any form of bar code, quick response (QR) code tag, near-field communication (NFC) code tag, radio-frequency identification (RFID) code tag, or any other equivalent device or technology known in the art, or later developed. It may be in the form of a separate piece of material (e.g., metal, plastic, etc.) that is installed in the vehicle (30), or it may be printed or otherwise provided within the vehicle 30 (e.g., printed on or integrally formed with one of the seats [20], or other surfaces or structures of, for example, an aircraft [30]).

The machine-readable tags (18) are adapted to be read by a user device (12), typically a mobile "smart" phone, although alternatively any form of laptop computer, tablet computer, personal digital assistant (PDA), netbook computer, and the like. The machine-readable tags (18) can be programmed to automate tasks, such as, for example, to change phone settings, create and send a text, launch an application, or any number of commands to be executed, limited only by the communication device.

The system (10), as discussed in greater detail below, may be programmed to allow, for example, advertisers, travel companies, promoters, performers, and the like to direct the individuals to a specific Web page, or have the user device (12) perform a specific action when the machine-readable tags (18) are scanned by the user device (12) (i.e., by a camera of the user device [12]). In the embodiment of FIG. 1, the user may be prompted via video, onboard announcement, written directions, etc., to scan the tag (18) in front of the user. The interactive mobile content (15) may include further elements, such as a coupon (13), and/or any other interactive features desired by one skilled in the art. While some other particular examples are discussed below, it should be understood that countless sales and marketing systems may be implemented using the system (10), and such alternatives should be considered within the scope of the present invention.

In this embodiment, at some point during a trip in the vehicle, such as near the end of a flight to a destination city, the users on the vehicle who have selected the coupon for download are determined, and each of the users who have downloaded the coupon are notified of the identities of the other users who downloaded the coupon, and of whom are present in the same vehicle, in this case an aircraft. Transportation of all of the users who have downloaded the coupon is facilitated, to the location of the restaurant so they may utilize the coupon which each of them downloaded. This may be done via ride sharing amongst the passengers, some of whom may already have cars at the airport, or it may be arranged via a ridesharing application (e.g., UBER®, etc.), via a charter vehicle (e.g., a limousine), or any other method known in the art.

In other embodiments, the machine-readable tags (18) may allow individuals to perform contactless transactions such as, for example, to purchase tickets, order meals, download coupons (13), and shop for merchandise while inside of the aircraft (30). In a typical embodiment, the plurality of machine-readable tags (18) are encrypted with data that can be updated remotely on a real time basis via, for example, a URL redirect page, or by sending and launching an application ("app"). In addition, in a typical embodiment, the plurality of machine-readable tags (18) are linked together and viewed as a network rather than individual tags (18).

In the embodiment of FIG. 1, the machine-readable tags (18) may be positioned on the plate (19) (e.g., metal or PVC plate, or sticker printed with a QR code, or other form of code, and/or containing NFC chips or other similar chips) and are programmed to perform individually designated actions. For example, NFC tags can be programmed to automate tasks such as, for example, allowing for a change of phone settings, a text to be created and sent, turning on a device via Bluetooth, and the like. In a typical embodiment, the system and method (10) allow the plurality of machine-readable tags (18) to be programmed to perform various designated actions, allowing operators of the aircraft (30) to cater personalized messages to specific sections or individual seats (20) within the vehicle (30), as well as one designated action for the entire vehicle (30), regardless of seating classes.

As shown in FIG. 1, the display screen (16) may display content that is synchronized with the geolocation of the vehicle, and/or the destination of the vehicle, to advertise a pertinent entertainment, place to eat, etc. A passenger may swipe or scan the user device (12) on the machine-readable tag (18), to receive, for example, a special promotional offer that is only offered at the location in which the aircraft (30) is headed or has landed. This may vary depending upon many factors, such as time of day, weather conditions, and any other local factors that may be pertinent. For example, if the aircraft is going to be landing in Las Vegas in the evening, suitable evening services in this city will be highlighted.

Also, the system (10) maintains the ability to present selected content to passengers located in first class seating versus coach seating, as discussed in greater detail below. In other embodiments, upon swiping or scanning the user devices (12), individuals may be directed to various advertisers' Web pages, depending on when the user device (12) was scanned, so that advertisers can provide multimedia content throughout the flight. As mentioned, the time of day/night may also be incorporated into the media selection criteria. Therefore, an aircraft (30) that is about to land in Las Vegas at night may play an advertisement for a steak restaurant located on the Las Vegas Strip on the screen (16) located on the back of the seat, and simultaneously the user device (12) would be directed to a Web site that contains a coupon (13) for download for that steak house. Alternatively, an aircraft (30) that is about to land in the morning in Los Angeles will receive programming and coupons (13) or other promotional offers related to breakfast options near Los Angelese International Airport. This may include any form of entertainment, dining, hotels, shows, etc., that may be of interest to a traveler at the designated location at the designated point in time (e.g., time of day, day of week, time of year, etc.). This is discussed in greater detail below.

Mobile payment is a rapidly expanding business segment, and NFC applications (e.g., contactless transactions) are expected to be the most widely adopted form of mobile payments. Embodiments of the invention provide individuals with the ability to establish radio communication between their user devices (12) and the plurality of machine-readable tags (18) by touching them together or bringing them into close proximity, usually within a few centimeters, via NFC. In some embodiments, the plurality of machine-readable tags (18) may also have the ability to download a digital coupon (13) onto the user devices (12), which could be redeemed at a local event or retail location. This provides concession owners, retail owners, and advertisers an ability to immediately see the conversion rate of a coupon (13) that is issued (i.e., 100 coupons [13] were scanned via the plurality of machine-readable tags [18] were redeemed). These digital coupons (13) could be redeemed at a specific geographic area, or worldwide.

In a typical embodiment, each of the plurality of machine-readable tags (18) has a unique identification number that is stored within a database, allowing a specific message to be delivered to each of the plurality of machine-readable tags (18) in the aircraft (30) at a given time. This enables individuals to order meals to be delivered to their seats (20) by scanning the plurality of machine-readable tags (18) with their device and being directed to a Web page. This is especially useful because it can be accomplished via a standard mobile Web browser, versus requiring the user to download an application onto their user device (12).

Along with remotely updating the plurality of machine-readable tags (18) with URL redirecting technology, the server system (40) (shown in FIG. 2) is configured to collect and aggregate analytical data every time the machine-readable tags (18) are scanned. The analytical data may be, for example, date and time, GPS location of a machine-readable tag (18), type of communication device used to scan a machine-readable tag (18), orientation of a user device (12) when the machine-readable tag (18) was scanned, and/or type of operating system of the user device (12) that scanned the tag (18). The server system (40) (of FIG. 2) then couples the collected analytical data from the physical scanning of machine-readable tag (18) with data collected once the individual is directed to a Web page. In a typical embodiment, the data may be, for example, time spent on a Web page, purchases made, IP address, personal information input by the user, and/or products viewed. Such data is of high value to, advertisers, airline company owners, local business owners, and the like, as it provides extensive insight into consumers' purchasing and Web browsing habits. This embodiment could also be used to allow for real time data/polling of passengers (i.e., flight satisfaction survey, etc.).

In a typical embodiment, remotely updated, machine-readable tag programming allows individuals to download digital coupons (13) directly to their user devices (12) and transfer the digital coupon (13) to other user devices (12). For example, upon bringing a user device (12) in close proximity to a machine-readable tag (18), an individual may be directed to a Web page with a downloadable digital coupon (13) for 10% off at a local retail store. If the individual transfers the digital coupon (13) from his/her user device (12) to, for example, five other user devices (12) within a fixed time period, e.g., one week, the coupon (13) offer automatically upgrades from 10% to 20% off at the local retail store. This capability incentivizes individuals to transfer their digital coupons (13) to family and friends so that they will receive greater discounts. Also, this capability will allow brands and retailers to watch their promotion go viral from a first point of download to various locations to which the coupons (13) are transferred between user devices (12). They may also be shared and tracked via NFC, MMS, and text message or social media such as Facebook, Twitter, Snapchat, and the like. Mobile coupons (13) may be browser-based or stored into users' digital wallets located on their user device (12).

FIG. 2 is a block diagram of one embodiment of the system of FIG. 1. As shown in FIG. 2, in this embodiment, the system (10) includes a server system (40) that is operably connected to a network. For purposes of this application, the term "server" (or any other similar term, such as "computer," "computer device," "electronic device," "user device," etc.), refers to any form of electronic device or plurality of devices having at least one computer processor, e.g., a central processing unit (CPU), and some form of computer memory having the capability to store data. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smartphone, a tablet, or any form of electronic device capable of functioning as described herein. Furthermore, while multiple devices may be used, as shown in FIG. 2, these may all be performed on a single computer device, or multiple associated computer devices, according to the teachings of one skilled in the art.

In the embodiment of FIG. 2, the server system (40) includes a content management server (42), a distribution server (46), and an analytics server (50). In the embodiment of FIG. 2, the server system (40) is operably connected to a network (such as the Internet) to enable the content management server (42), the distribution server (46), and the analytics server (50) to operably interact with the user devices (12) and to provide the necessary content to the user devices (12) and to the screens (16).

A content management portal (44), generated by the content management server (42), may be used to determine the content that is correlated with the current geolocation or destination, and transmit the content to the display screens (16) of the vehicle (30). It may also be used to determine the mobile content (15) that is provided via the distribution server (46) to the user devices (12).

An analytics portal (52) generated by the analytics server (50) may be used to operatively generate, display, and report analytics data regarding the operation of the system (10). Some components, such as the analytics server (50), may not be included in some embodiments, and other additional components may be included in alternative embodiments. The configuration and function of these servers is discussed in greater detail below.

The term "computer memory" as used herein refers to any tangible, nontransitory storage that participates in providing instructions to a processor for execution. Such a medium may take many forms, including, but not limited to, non-volatile media, volatile media, and any equivalent media known in the art. Nonvolatile media includes, for example, ROM, magnetic media, and optical storage media. Volatile media includes, for example, DRAM, which typically serves as the main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge or any other medium from which a computer can read. While several examples are provided above, these examples are not meant to be limiting, but illustrative of several common examples, and any similar or equivalent devices or systems may be used that are known to those skilled in the art.

Furthermore, the term "database" as used herein, refers to any form of one or more (or combination of) relational databases, object-oriented databases, hierarchical databases, network databases, nonrelational (e.g. NoSQL) databases, document store databases, in-memory databases, programs, tables, files, lists, or any form of programming structure or structures that function to store data as described herein.

Figure 3:
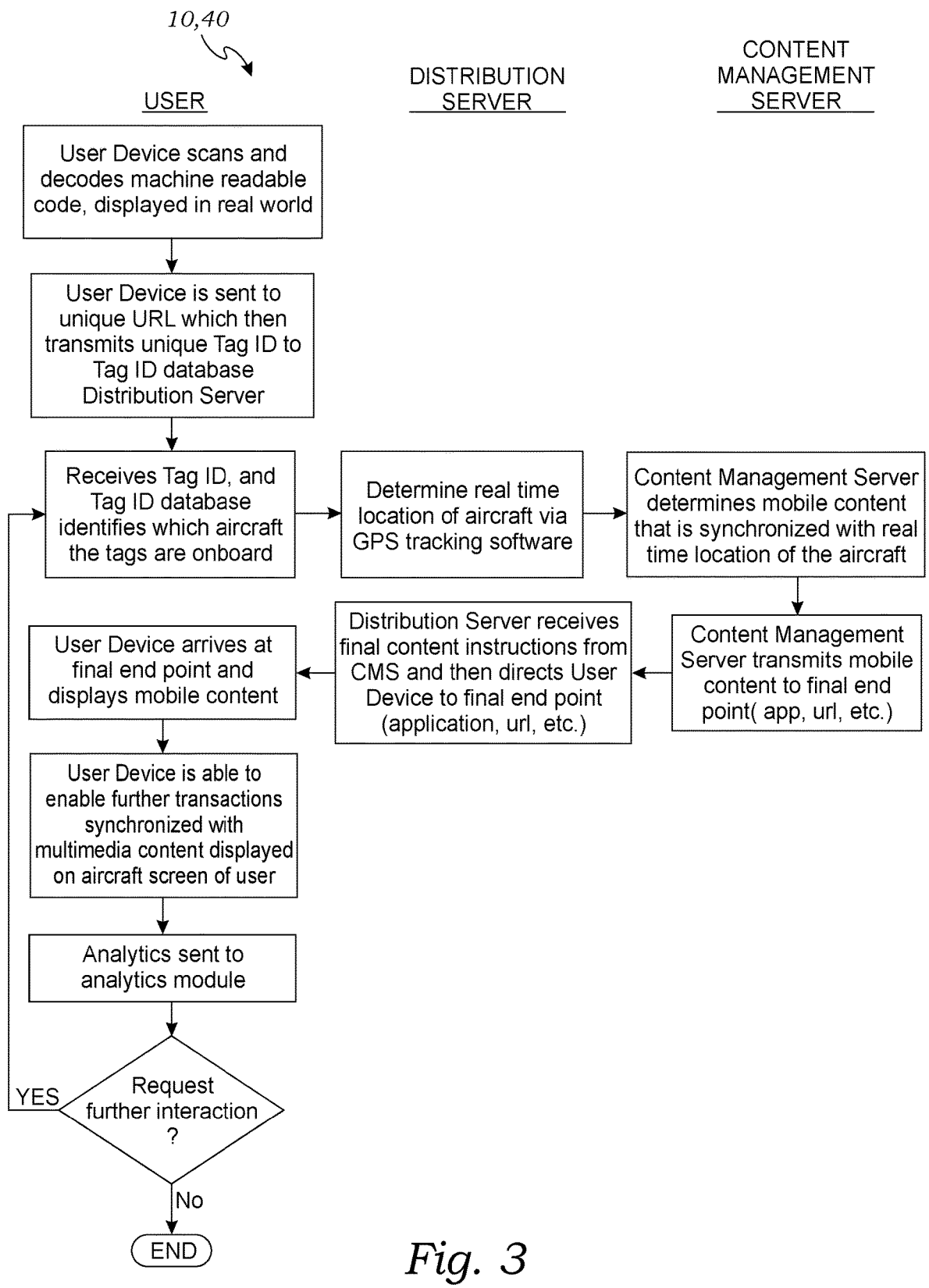
FIG. 3 is a flow diagram illustrating the operation of the system to provide synchronized mobile content to the user device.
Figure 4:
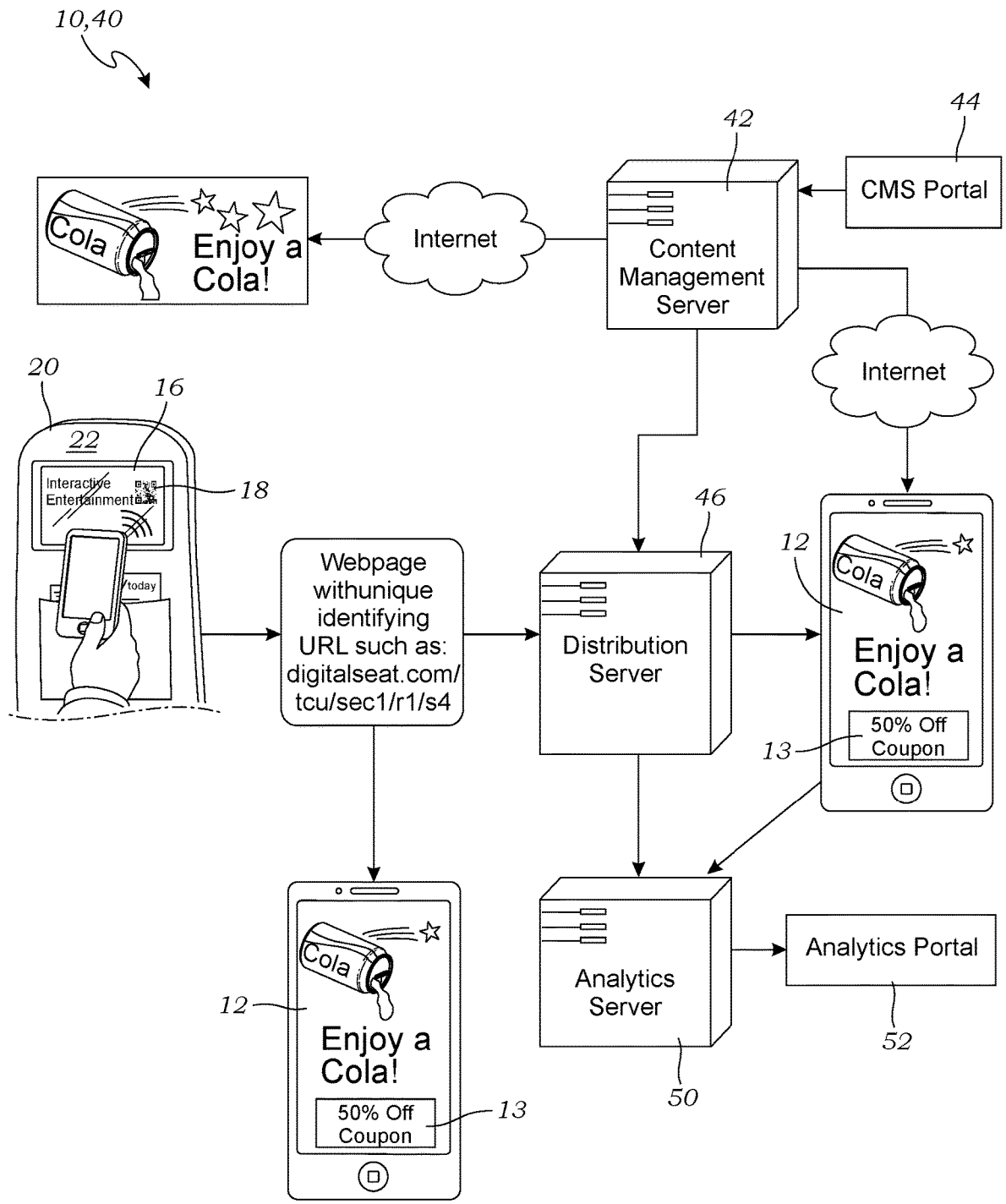
FIG. 4 is a block diagram illustrating the function of one embodiment of the system.

FIG. 3 is a flow diagram illustrating the operation of the systems (10) to provide synchronized mobile content (15) to the user device (12), and multimedia content to the display screens (16) of the aircraft. FIG. 4 is a block diagram illustrating the function of the system (10). As shown in FIGS. 1-4, the computer memory of the server system (40) (of FIG. 1) stores executable code that enables the server system (40) to perform a process that comprises multiple steps, as discussed in greater detail below.

First, a user device (12) is used to scan the machine-readable tag (18), as shown in FIG. 1. This scanning enables the user device (12) to be is sent to a unique URL, using methods known in the art. A unique tag ID from the tag (18) is sent to the server system (40) to determine the current location of the vehicle (30). This may be determined with reference to a flight database that includes the location of the aircraft or other vehicle or via the GPS-determined location of the user device (12) using GPS tracking software available on the market, or the location of the destination of that specific aircraft (30) based on publicly flight data.

The content management server (42), shown in FIG. 2, determines the mobile content (15) that is synchronized with the real time location of the aircraft, and/or the intended destination of the aircraft, and this content is provided to the final endpoint that is provided to the mobile device (12). The mobile content (15) is then displayed on the user device (12). Once the mobile content (15) has reached its final end point, the user device (12) is able to perform further synchronized transactions.

The analytics server (50) is used to store analytics information in a suitable database, which may be stored and accessed via an analytics portal (52), as seen in FIG. 2. The analytics portal (52) may generate a suitable GUI interface to enable data to be collected, stored, and reported, either via the system (40) or exported to any interested parties, customers, marketers, advertisers, etc.

The server system (40) may also provide multimedia content to the display screens (16) of the vehicle, which are synchronized with the mobile content (15) provided to the user device (12). As shown in FIGS. 2-4, in this embodiment, the content management server (42) receives a request from the distribution server (46) and determines the mobile content (15) that should be sent to the user device (12). The mobile content (15) is selected to be synchronized with the real-time geolocation of the aircraft (30). The geolocation distribution server (46) receives final content instructions from CMS (42) and directs the user device (12) to the final endpoint (application, URL, etc.). The user device (12) then displays the mobile content (15) to the user. The interactive mobile content (15) that corresponds with the geolocation of the aircraft (30) may be provided and updated in real time. For the purposes of this application, the terms "real time" and "real-time" mean any interactions that are provided within 10 seconds of passing through location coordinates. Since this is synchronized with, in this embodiment, the geolocation of the aircraft (30), this enables the user device (12) to engage in many synchronized activities, transactions, etc., based on its location.

As shown in FIGS. 2-4, these interactions are occurring, analytics of the user activities, etc., may be directed to the analytics server (50) for collection. Marketers may then access this information via an analytics portal (52) to guide further promotions, etc. Providing interactive mobile content (15) may include steps of generating a Web site that includes the desired content and transmitting the Web site to the user device (12). In one embodiment, the content management portal (44) performs the following steps in conjunction with the server system (40): customizing the media content and the interactive mobile content (15) based on real-time geolocation data received from an aircraft location distribution server (46), and, responsive to commands in real time, transmitting the customized interactive mobile content (15) to the user devices (12).

Providing interactive mobile content (15) may also include the steps of generating the desired content in a format for use in a mobile application and transmitting the mobile application and the desired content to the user device (12). In one embodiment, the system (10) utilizes a cloud-based application (or "app"). For the cloud-based app to work, it is written (in a suitable format for iOS, Android, etc.) and then either loaded onto the cloud-based platform or ported into a cloud-based operating system. Once in the cloud platform, the app can be accessed from a user device (12) and displayed as if it were running natively on the user device (12). In operation, once the user scans the tag, the geolocation distribution server (46) receives the incoming user scan, then asks the content management server (42) where it should point the user, and then directs the user device (12) to display the cloud-based application. The content management server (42) may include the ability to change the content on the cloud-based application independently or in conjunction with the geolocation of the user device (12).

In another embodiment, the system (10) utilizes an "instant app." Instant apps download small samples of an application onto a user device (12), which will then run as a full application without the need for a physical download by the user. An instant app differs from a cloud-based app because it may download a small amount of information onto the user device to enable operation. In use, once the user scans the tag, the geolocation distribution server (46) receives the incoming user scan, then asks the content management server (42) where it should point the user, and then directs the user device (12) to display the instant application. The term "instant app" refers to any application that can be opened before requiring installation by the user on any manner of mobile device operating system.

Figure 5:
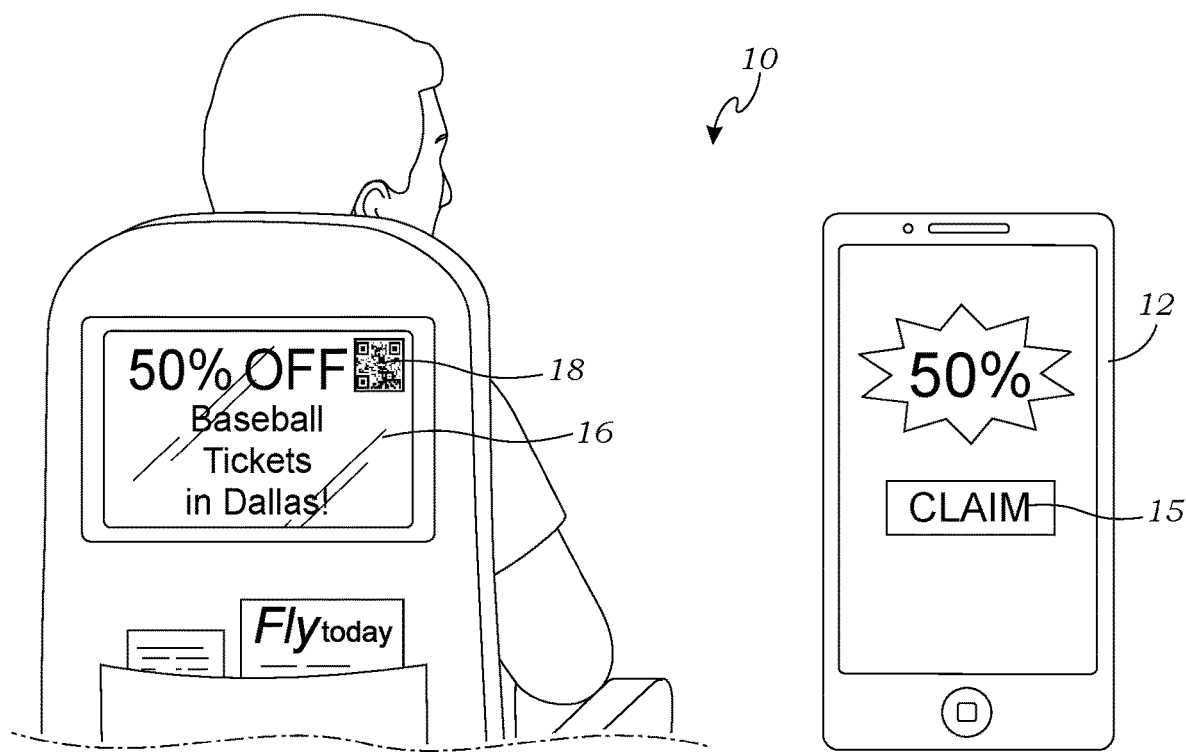
FIG. 5 is a second embodiment of the system of FIG. 1.

FIG. 5 is another embodiment of the system (10) of FIG. 1. In this embodiment, multimedia content is displayed on the display screen (16) of the vehicle, the multimedia content being directed to an entertainment (in this case, a baseball game) that is occurring in the destination city. When the user scans the machine-readable tag (18), the user device (12) is directed to content that includes a coupon (13) for the baseball game. The coupon (13) is synchronized with the multimedia being displayed on the display screen (16). The link for the discounted tickets could only be accessed via the machine-readable tag 18 in that specific aircraft (30) or other aircraft flying to Dallas.

Figure 6:
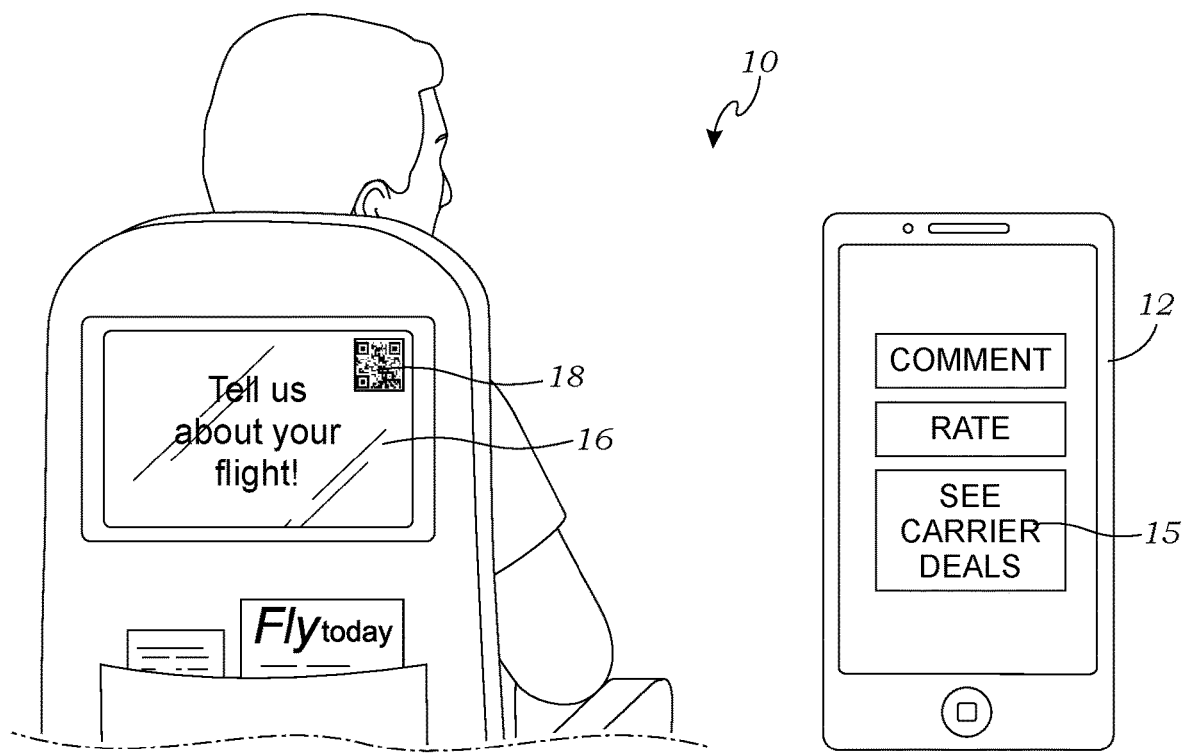
FIG. 6 is a third embodiment of the system of FIG. 1.

FIG. 6 is another embodiment of the system (10) of FIG. 1. The machine-readable tags (18) may provide customized interactive mobile content (15), which may include an opportunity for the user to provide feedback regarding real-time activities. The opportunity for the user to provide feedback may include, e.g., a survey of the user's opinion, a comment field for the user to provide a comment, and/or an opportunity to upload a photo, video, or other form of media, for inclusion in further multimedia production. In one embodiment, a multimedia production may be presented on display screens (16) within the aircraft (30) via scheduling software and may include an invitation for viewer response. The machine-readable tags (18) have the ability to sync to the multimedia production, which may include a call to vote (or otherwise interact) regarding the media. It may also include feedback regarding the interaction, such as the current results of the vote. This may also or alternatively include other forms of feedback, responses, comments, text messages, etc., such as may be devised by one skilled in this art.

As used in this application, the words "a," "an," and "one" are defined to include one or more of the referenced item unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A system for providing an interactive mobile content to a user device based upon a geolocation of a vehicle, the system comprising:
   a. a server system having a computer processor and a computer memory, the computer memory storing the interactive mobile content accessible to the server system;
   b. a machine-readable tag encoded with an address that includes a unique tag identifier, the encoded address identifiable by the server system, the machine-readable tag situated in the vehicle; and
   c. wherein the computer memory of the server system stores executable code that, when executed, enables the server system to perform a process that comprises the following steps:
      i. receiving a request from the user device, the request generated in response to scanning the machine-readable tag with the user device;
      ii. based on the unique tag identifier, determining a current geolocation or a destination geolocation of the vehicle;
      iii. selecting the interactive mobile content that is associated with the current geolocation or a destination location of the vehicle and providing to the user device, via a uniform resource locator (URL), a selected interactive mobile content, the selected interactive mobile content having a user-generated feedback including a comment field for the user to provide a comment, a survey of an opinion of the user, or both, the user-generated feedback regarding real-time actions within the vehicle; and
      iv. in response to detecting a change in the current geolocation or the destination location of the vehicle, updating the selected interactive mobile content.

2. The system of claim 1 wherein the server system performs the following additional steps:
   d. providing a media content based on the current geolocation of the vehicle to a display screen mounted in the vehicle;
   e. synchronizing the selected interactive mobile content with the media content; and
   f. responsive to commands in real time, transmitting the synchronized, selected interactive mobile content to the user device.

3. The system of claim 1 wherein the user-generated feedback further includes incorporating the feedback into the mobile content provided to a display screen mounted in the vehicle.

4. The system of claim 1 wherein the machine-readable tag includes a quick response (QR) code, a snapcode, a near-field communication (NFC) code tag, or a radio-frequency identification (RFID) code tag.

5. The system of claim 1 wherein the server system performs the following additional steps:
   d. providing the interactive mobile content by generating the selected interactive mobile content in a format for use in a mobile application; and
   e. transmitting the mobile application and the desired content to the user device.

6. The system of claim 1 wherein the machine-readable tag is situated on a seat in the vehicle in the form of a printed code or a displayed code that is displayed on a display screen.

7. The system of claim 1 wherein updating the selected interactive mobile content includes selecting interactive mobile content that relates to the changed geolocation.

8. A method comprising:
   a. accessing information from a machine-readable tag by scanning said machine-readable tag with a user device wherein the machine-readable tag is mounted within a vehicle;
   b. determining a real-time geolocation of a user device based upon information obtained from the machine-readable tag;
   c. selecting an interactive media content based upon the real-time geolocation;
   d. delivering the interactive media content to the user device via an application downloaded on the user device or via a uniform resource locator (URL);
   e. responsive to detecting a change in the real-time geolocation of the user device, selecting an alternative interactive media content based upon the changed geolocation of the user device, wherein detecting a change in the real-time geolocation of the user device includes determining that the changed geolocation of the user device is within 30 miles of an intended destination location; and
   f. delivering the alternative interactive media content to the user device.

9. The method of claim 8 wherein determining the real-time geolocation of a user device includes determining the real-time geolocation within 10 seconds of passing through a set of location coordinates.

10. A method comprising:
    a. accessing information from a machine-readable tag by scanning said machine-readable tag with a user device wherein the machine-readable tag is mounted within a vehicle;
    b. determining a real-time geolocation of a user device based upon information obtained from the machine-readable tag;
    c. selecting a coupon for a live event occurring at the determined real-time geolocation;

d. delivering interactive media content that includes the coupon to the user device via an application downloaded on the user device or via a uniform resource locator (URL);
e. responsive to detecting a change in the real-time geolocation of the user device, selecting an alternative interactive media content based upon the changed geolocation of the user device; and
f. delivering the alternative interactive media content to the user device.

* * * * *